United States Patent [19]
Gordon et al.

[11] Patent Number: 5,414,805
[45] Date of Patent: May 9, 1995

[54] VISUAL DISPLAY TRANSITION EFFECTS USING SORTED TABLE OF DISPLAY CELLS

[75] Inventors: Robert D. Gordon, Sunnyvale; Joseph F. Sinnott, Jr., Palo Alto; Lonnie S. Walling, Ben Lomond, all of Calif.

[73] Assignee: International Business Machines Corporation, Armonk, N.Y.

[21] Appl. No.: 972,696

[22] Filed: Nov. 6, 1992

[51] Int. Cl.6 .............................. G06F 15/62
[52] U.S. Cl. .................. 395/133; 395/136; 395/127
[58] Field of Search ............... 395/133–139, 395/119, 125, 126, 127; 358/160

[56] References Cited

U.S. PATENT DOCUMENTS

| | | | |
|---|---|---|---|
| 4,218,711 | 8/1980 | Kashigi | 358/183 |
| 4,533,952 | 8/1985 | Norman, III | 358/160 |
| 4,774,678 | 9/1988 | David et al. | 364/518 |
| 4,879,597 | 11/1989 | Barton et al. | 358/88 |
| 5,067,019 | 11/1991 | Juday et al. | 358/160 |
| 5,115,402 | 5/1992 | Matsushiro et al. | 395/141 |

Primary Examiner—Almis Jankus
Attorney, Agent, or Firm—Andrew J. Dillon; David J. Kappos

[57] ABSTRACT

A computer system generates transition effects for use on a visual display. The system includes a binary table for describing a transition effect and a method for ordering the rows in the table to produce the transition. The table includes an arbitrary number of rows, each row representing a cell (group of picture elements) on the display. A numerical value, based on any function of cell location, is associated with each cell. The table is then sorted according to the numerical values. Each row in the sorted table drives a step in the transition effect. The cells described by the various rows are changed in sorted order to display the material from the image being transitioned-to. The sequence of processing of the rows causes the desired transition effect. By varying the function used to order the rows, an infinite variety of transition effects can be created.

20 Claims, 4 Drawing Sheets

COMPUTER SYSTEM

COMPUTER SYSTEM

| SOURCE | | w | h | TARGET | | NUMERICAL VALUE |
|---|---|---|---|---|---|---|
| X | Y | | | X | Y | |
| 0 | 0 | 160 | 120 | 0 | 0 | 3 |
| 0 | 120 | 160 | 120 | 0 | 120 | 2 |
| 160 | 0 | 160 | 120 | 160 | 0 | 2 |
| 320 | 0 | 160 | 120 | 320 | 0 | 1 |
| 160 | 120 | 160 | 120 | 160 | 120 | 1 |
| 0 | 240 | 160 | 120 | 0 | 240 | 1 |
| 160 | 240 | 160 | 120 | 160 | 240 | 0 |
| 0 | 360 | 160 | 120 | 0 | 360 | 0 |
| 320 | 120 | 160 | 120 | 320 | 120 | 0 |
| 480 | 0 | 160 | 120 | 480 | 0 | 0 |
| 480 | 120 | 160 | 120 | 480 | 120 | −1 |
| 160 | 360 | 160 | 120 | 160 | 360 | −1 |
| 320 | 240 | 160 | 120 | 320 | 240 | −1 |
| 320 | 360 | 160 | 120 | 320 | 360 | −2 |
| 480 | 240 | 160 | 120 | 480 | 240 | −2 |
| 480 | 360 | 160 | 120 | 480 | 360 | −3 |

TRANSITION EFFECT CELL TABLE

DISPLAY CELL NUMERICAL VALUES

VISUAL DISPLAY TRANSITION EFFECTS USING SORTED TABLE OF DISPLAY CELLS

FIELD OF THE INVENTION

This invention relates in general to computer based multimedia presentation systems, and in particular to providing transitions between images displayed on such systems.

BACKGROUND OF THE INVENTION

Video productions involve frequent scene changes. Such changes may be accomplished by simply splicing scenes together to create an abrupt cut between scenes, or may alternately involve gradual changes known as transition effects. Many types of transition effects are well known in the video industry, including fades, wipes (left-to-right, right-to-left, top-to-bottom, etc.), patterns, etc. Typically, these transition effects are generated directly against the analog video signal by analog electronic circuitry, with different circuitry being required to create each family of effects. The hardware required to create such transition effects is costly, and in practice only economically feasible in commercial applications.

Recent advances in microprocessors and random access memory have made it possible to manipulate images in digital form. This in turn has lead to a new class of applications known as "multimedia," which combine audio, video, and text to create presentations. As part of their image processing capabilities, some of these multimedia applications include facilities to create transition effects. These applications represent an improvement over traditional video transition effects generators in that they do not require special hardware; instead they use computer programs to cream transition effects by directly manipulating the digital representations of images stored in computer memory.

However, while the programming solution to transition effects is an improvement over its hardware ancestor, it is not without limitations. The chief drawback of program transition effects is that each effect requires its own coded procedure. Thus, to provide a variety of effects a substantial investment in programming is required. Additionally, complex effects require equally complex programming, further increasing cost. Finally, regardless of how many effects are provided, no capability is available to create custom effects adapted to a specific user requirement, short of coding an additional program.

Thus, there has heretofore existed an unmet need for a computer-based system capable of providing an extensible library of transition effects without the use of separately coded procedures.

SUMMARY OF THE INVENTION

In accordance with the invention, a system is provided for generating unlimited transition effects for use on a visual display. The system includes a binary table for describing a transition effect and a method for ordering the rows in the table to produce the transition. The table includes an arbitrary number of rows, each row representing a cell (group of picture elements) on the display. If a high resolution transition effect is desired, the display is divided into many cells, resulting in a table having many rows; if lower resolution is desired, fewer cells are designated, hence few rows in the table. Each row includes fields designating the location of the source cell, the cell size, and the location of the target cell. A numerical value is associated with each cell. This value may be generated based on any function of cell location. For instance, a mathematical expression may be developed to represent the desired transition in terms of X and Y coordinates on the display, and solved for each row of the table by substituting the source or target cell coordinates for the X and Y variables. The table is then sorted according to the numerical values. Rows having the same solution value can be sub-sorted into random order to remove the illusion of motion where none is desired, or according to a second function of cell location if desired. Alternatively, the sorting step can be omitted by computing the numerical values before constructing the table, and then constructing the table in sorted order.

Each row in the sorted table drives a step in the transition effect. The source-to-target cell mapping described by each row is performed in the sorted order, and the result is placed in the target cell position of the display buffer as each row is processed, causing the same cell on the visual display to change. The source for the image data can be a new image or the currently displayed image; thus, the transition can result in replacement of the current image with a new image or in a re-representation of the current image. The order of processing causes the desired transition effect. Thus, a single program can be used to generate any transition effect by simply changing the function according to which the numerical values are determined. Also, various mathematical expressions and sorting orders can be combined to create an infinite number of effects.

Additional features of the invention include panel transitions, timing marks, and table clipping. Panel transitions are created by dividing the display into one or more identically sized panels and constructing the transition table in such a way that transitions occur in a number of panels. The table can be ordered so that all panel transitions appear to complete simultaneously, or alternatively so that they appear to complete sequentially. Timing marks are used to pace a transition so that the time over which it takes place is long enough for the transition effect to be visualized. The marks are placed on one or more rows in the transition table to indicate that a pause is to be taken after the row is processed. Table clipping refers to tagging each row of the transition table according to the area(s) of the display affected by that row. Then, when a transition is performed involving part of the display, table rows that do not affect that portion of the display are omitted from processing.

BRIEF DESCRIPTION OF THE DRAWINGS

FIG. 5a is a table illustrating a cell mapping table constructed as part of an exemplary transition effect.

FIG. 5b is a table illustrating the numerical values associated with cells corresponding to the cell mapping table of FIG. 5a.

DETAILED DESCRIPTION OF THE INVENTION

Figure 1:
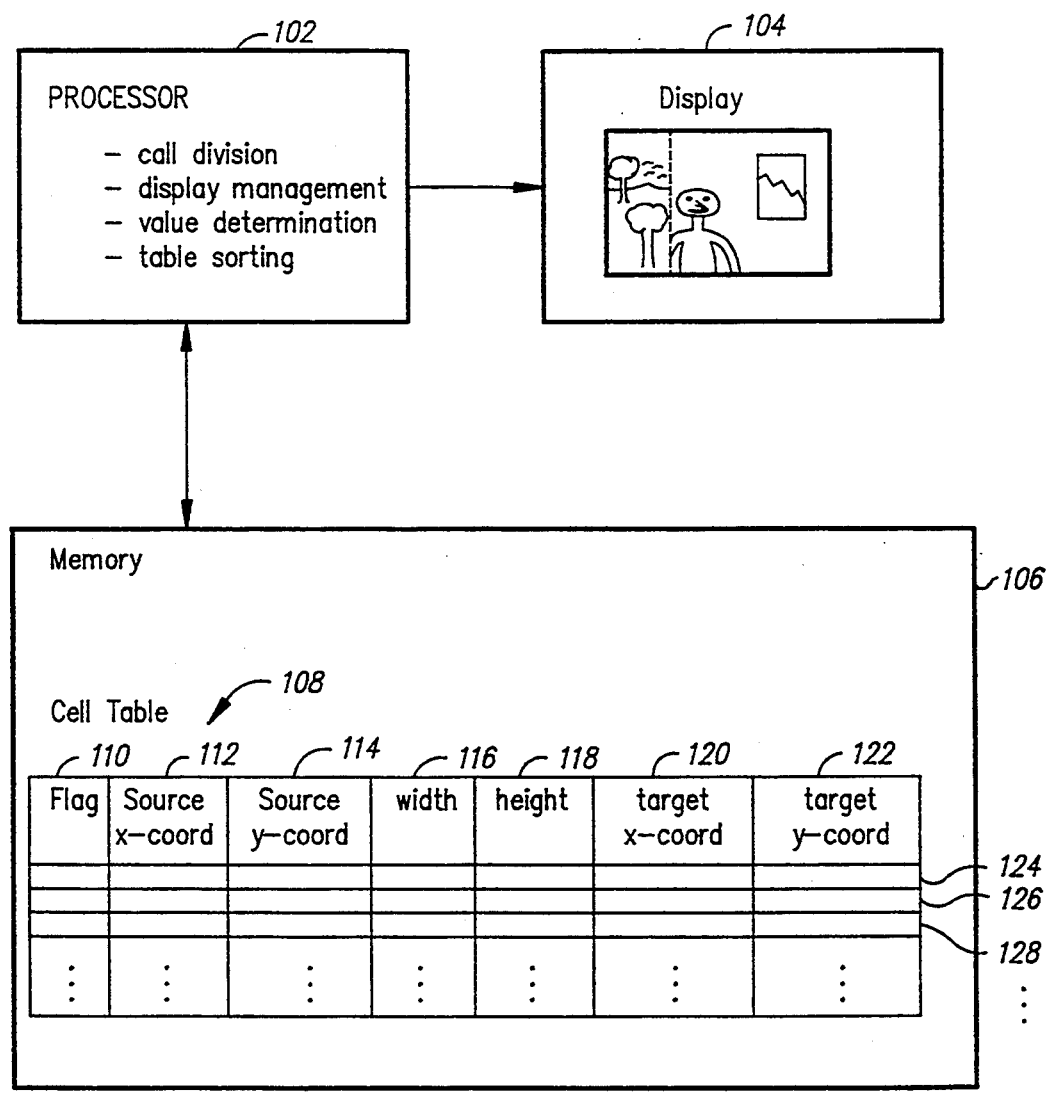
FIG. 1 is a block diagram illustrating a computer system programmed in accordance with the present invention.

Shown in FIG. 1 is a block diagram illustrating a computer system programmed in accordance with the present invention. The system includes computer processor 102, visual display 104 and memory 106. Memory 106 itself contains display data generally and in specific cell table 108 which is divided into sub-fields including flag 110, source X-coordinate 112, source Y-coordinate 114, cell width 116, cell height 118, target X-coordinate 120, and target Y-coordinate 122. The information provided by cell table 108 is contained in rows 124, 126, 128, etc. Processor 102 may be a microprocessor or any other instruction-executing computer processor means. Visual display 104 may be a computer graphics display, a television-type display, a flat panel display, a projection television system, or any other means for electronically presenting information. Memory 106 may be RAM memory, disk memory, optical, tape, bubble, or any other form of electronically accessible data storage. Normally, currently accessed information including cell table 108 is stored in RAM where it is readily available to processor 102. Other data, such as image files not currently being presented on display 104, is stored on disk or tape where it is still accessible albeit at a lower rate.

In operation, processor 102 accesses display data from memory 106 and provides it to display 104, which presents the data in visual form. With reference generally to the present invention, when a particular transition effect is to be created (such as the "wipe" effect shown in progress on display 104), processor 102 divides the display space into cells, determines the values for each row of cell table 108 in accordance with a user-provided function, sorts cell table 108 using the determined values, and drives the transition effect using the sorted cell table. These aspects of the invention will be described in detail subsequently.

Cell table 108 is the organizational nucleus for creating transition effects in accordance with the present invention. It contains a row corresponding to each cell (124, 126, 128, etc). The information provided for each row includes the size of the cell (width 116 and height 118), the source location of the cell (X-coordinate 112 and Y-coordinate 114), the target location of the cell (X-coordinate 120 and Y-coordinate 122), and flag field 110 for identifying conditions such as a pause to be taken after processing of the cell.

Figure 2:
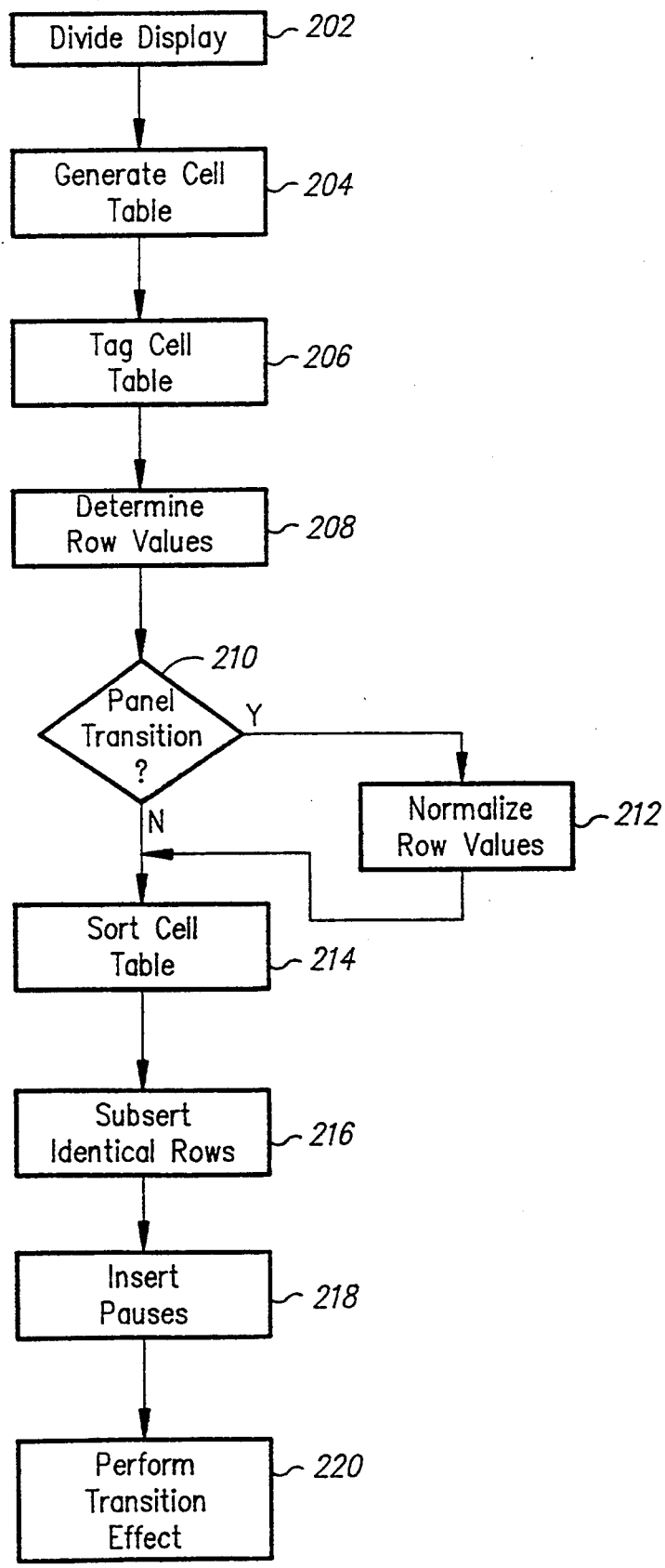
FIG. 2 is a flow chart illustrating the processing which provides transition effects in accordance with the present invention.

Shown in FIG. 2 is a flow chart illustrating the processing which provides transition effects in accordance with the present invention. At 202, the display is divided into groups of picture elements (pels) called cells. Any number of cells may be chosen, and any cell shape and size may be used. In cases where high resolution transition effects are desired, a small cell size is selected, resulting in a large number of cells; where lower resolution can be tolerated a larger cell size is selected, reducing the number of cells and the CPU time required to create the transition effect. Thus, it will be apparent to those of skill in the art that varying the cell size may be used as a means of tailoring the elapsed time of an effect. In the preferred embodiment, the display is divided into rectangular cells of equal size such that the resulting cell array is logically regular (10 cells by 10 cells, 10 cells by 20 cells, 30 cells by 40 cells, etc). This eases processing complexity in creating the transition effect.

At 204, a cell table is created having one row for each cell. In the case of a simple transition in which one image completely overlays another and all cells are the same size, each entry in the cell table need only identify a cell location. In the preferred embodiment, cell table 108 shown in FIG. 1 is used. Width 116 and height 118 are entered for each cell in accordance with the selected cell dimensions. Source X-coordinate 112 and source Y-coordinate 114 represent the cartesian position within the transition-to-image from which the cell is to originate. Target X-coordinate 120 and target Y-coordinate 122 represent the cartesian position on the display where the cell is to be placed. For simple transitions the corresponding source and target coordinates are given the same values, indicating that the cell is to be placed on the display at the same position as the one it occupies in the source image. This non-translated mapping is normally used where the intended result of the transition effect is to overlay one image onto another without creating the impression of the images moving as the transition takes place. The source for the image data can be a new image or the currently displayed image; thus, the transition can result in replacement of the current image with a new image, or in re- representation of the current image translated in some way on the display. For transitions where it is desired to create the effect that one image is moving across the display as it replaces another, the target coordinates are varied with respect to the source coordinates in the direction and at the rate needed to produce the desired motion. Thus, for example, if it is desired that image B replace image A by moving down the screen from top to bottom, a cell table is created with low source Y-coordinate values mapping to high target Y-coordinate values, which causes the bottom of image B to replace the top of image A. If this transition is performed in three steps, the table rows will cause the following three actions to take place: first, the bottom third of the new image is displayed in place of the top third of the current image; second, the bottom two-thirds of the new image is displayed in place of the top two thirds of the current image; and finally, the entire new image is displayed in place of the current image.

Figure 3:
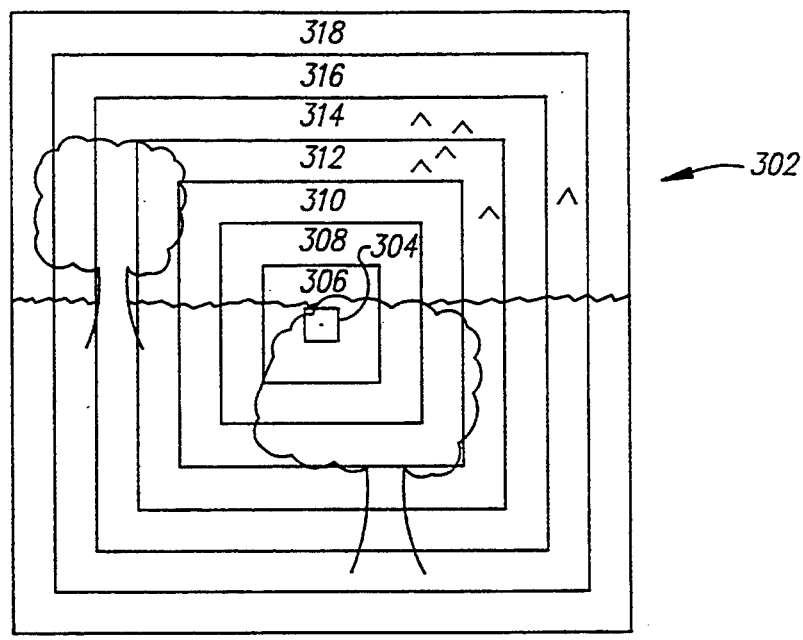
FIG. 3 is a depiction of a visual display divided into concentric rectangles.

At 206, each row of the cell table is given a clipping tag according to the region(s) of the screen affected by that row. The purpose of this step is to enable the subsequent elimination of unnecessary computations by omitting the processing of cells which cannot participate in a transition. In general, tagging is accomplished by subdividing the display, determining which cell(s) are in each subdivision, and marking the cells accordingly. In the preferred embodiment, the clipping tags are established by dividing the display into eight concentric rectangles. An example of such a division is shown in FIG. 3, where display 302 is divided into concentric rectangles 304-318. The center of the set of rectangles is specified according to the nature of the transition effect. Nine possible transition centers are provided, including each corner of the display, the center of each edge, and the center of the display. Complementing the eight concentric rectangles, in the preferred embodiment, for each row of cell table 108, flag field 110 includes eight bits, one for each rectangle. Each row is tested against each rectangle, and bits are set on to indicate the rectangles affected by the row. Thus, as will be described in detail below, when the transition effect is subsequently performed, each row can be pre-screened and omitted from processing if none of the tag bits in its clipping tag correspond to the regions of the display (rectangles) known to be affected by the transition.

At 208, a user-supplied function is used to determine a value for association with each row of the cell table. The function is typically an equation whose result or output varies with cell position, although any function may be used. In the preferred embodiment, the function includes X and Y cartesian coordinates and yields a numerical result which is maintained in association with the corresponding row of the cell table, but is not actually a part of the cell table. Since the numerical values ultimately determine the nature of the effect created on the display, the function must be chosen according to the exact effect desired. For example, if a simple wipe effect across the display from left to right is desired, then a function of the form: numerical value=X is selected. Alternatively, if the desired effect is a growing circle having its center at the center of the display, a function of the form: numerical value=$X^2+Y^2$ is selected. Whatever effect is chosen, the function is solved for each row of the cell table to yield a set of numerical values, one for each display cell.

At 210, a determination is made whether the user desires a panel transition. A panel transition is a set of transition effects in which the display is divided into one or more identically sized areas called panels. The effect can be made to proceed such that all panel transitions appear to be occurring simultaneously and appear to complete simultaneously. Alternatively, the panel transitions can be made to occur sequentially in whatever order the user desires. To create a panel transition, a sorting vector is constructed for each panel. A sorting vector is applied to the numerical values associated with the cell table to normalize the values so that, to the extent simultaneous transitions are desired, processing for each panel is distributed over the same range of numerical values. Adaptations are readily accommodated by selective use of sorting vectors. Thus, panels may be grouped and normalized such that the processing for one group completes before the processing for the next group begins, creating the effect of a sequence of transitions in which each step of the sequence involve simultaneous panel transitions. Of course, innumerable variations may be achieved using this approach.

Figure 4:
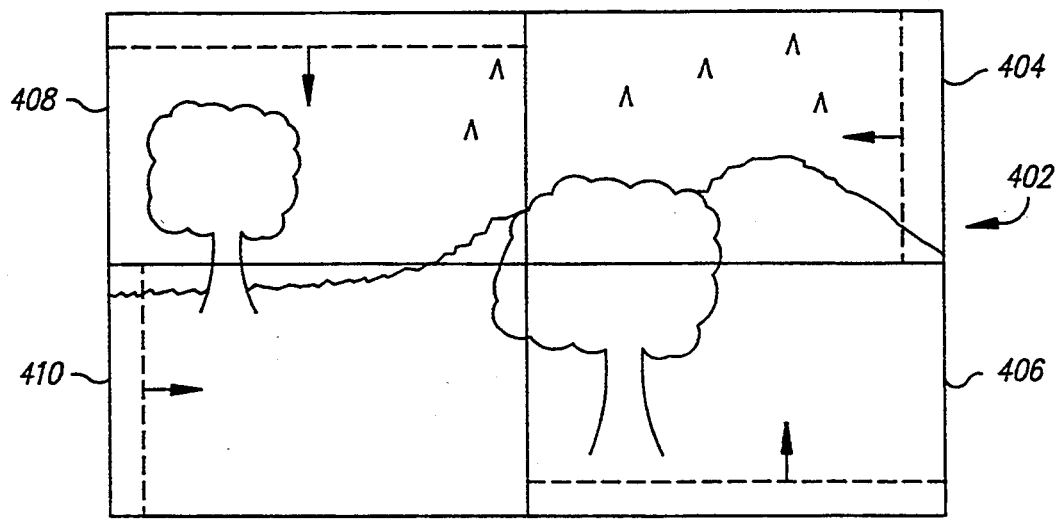
FIG. 4 is a depiction of a visual display in the process of performing a panel transition effect.

An example of a panel transition is shown in FIG. 4. Display 402 is divided into a two-by-two array of four panels, 404, 406, 408 and 410. The desired transition effect is to occur simultaneously on all four panels, with panel 404 performing a wipe from right to left, panel 406 performing a wipe from bottom to top, panel 408 performing a wipe from top to bottom, and panel 410 performing a wipe from left to right. The exemplary display size is 640 pels by 480 pels; thus, each panel is 320 by 240 pels. The cell size is chosen as 2 pels by 2 pels; thus, the left and right transitions will require 160 rows each in the cell table (320 divided by 2), and the up and down transitions will require a 120 rows each (240 divided by 2). The required functions are: 160 minus X for panel 404, Y for panel 406, 120 minus Y for panel 408, and X for panel 410.

A sorting vector is established for panel 404 to normalize its numerical values with those of panel 410. The appropriate sorting vector is X minus 160. A second sorting vector is established for panel 408 to normalize its numerical values with those of panel 410. The appropriate vector is Y minus 120. Finally, a third sorting vector is established to normalize panels 406 and 408 with panels 404 and 410. This vector is the ratio 160 divided by 120 Y. When the numerical values are calculated and the sorting vectors applied, the result is that all rows in the cell table will have numerical values in the range of 1 to 160. Thus, when the transition is eventually performed, the four panels will be intermingled during processing to create the effect of four transitions proceeding and completing simultaneously.

Returning to FIG. 2 at 210, if a panel transition is called for, the row values corresponding to the cell table are normalized at 212, as described above. Processing then continues at 214, where the cell table is sorted according to the numerical values associated with the rows. Sorting the cell table is the mechanism that creates the effect of coordinated motion when the transition is performed. Sorting may be used to impose any order on the table corresponding to the desired effect. For instance, increasing numerical order may be used as the basis for sorting to create a left-to-right or bottom-to-top effect, while decreasing numerical order may be used to achieve the opposite. Other orders are possible as well, such as skip sequence or converging sequence based on some target row. Thus, it is apparent that overlap may exist between determination of row values and sorting of the cell table and that each step may be used to insert a level of indirection into the resulting transition effect.

It is to be noted that sorting step 214 may be omitted if desired, and its function performed elsewhere in the transition effect construction process. This is accomplished by delaying creation of the cell table until the numerical values have been computed, and then building the cell table in sorted order according to the numerical values. The result is identical to that of the preferred embodiment, and the technique is accordingly considered to be within the scope of the present invention.

At 216, a third level of indirection is applied to the cell table by sub-sorting those rows whose numerical values are the same. Sub-sorting is typically used not to create the illusion of motion, but to remove it. This is accomplished by randomizing rows having the same numerical value. Thus, if the desired effect is a growing circle with no sense of motion "around" the circle as it grows, each set of rows describing a state of the circle (i.e. having the same numerical value) is randomized. Likewise, if the desired effect is a horizontal wipe with no sense of vertical motion as the transition moves across the screen, each set of rows on the same vertical line is randomized.

Alternatively to removing the illusion of motion, sub-sorting can be used to create additional motion in transition effects. This is accomplished by assigning a second function whose solution or output varies according to cell position, solving this function for groups of rows having identical numerical values, and sorting these groups of rows accordingly. Thus, if the desired effect is a growing circle with a swirling motion around the circle as it grows, each set of rows describing a state of the circle is sub-sorted using a second function based on the angular position of the cell (e.g. $+\theta, -\theta$).

Once the appropriate sub-sorting is completed, processing proceeds at 218, where user-identified pauses may be inserted into the transition effect to pace the resulting transition. The purpose of these pauses is to create a desired rate of motion on the display as the transition occurs. Thus, in the expanding circle example described above, if it is desired to have the circle expand slowly at first and more rapidly as the transition nears completion, pauses are added between the processing of rows early in the cell table. Alternatively, in a case where an entire transition occurs more quickly than is desired under a certain application or on certain hardware, pauses can be inserted uniformly throughout the cell table to moderate the pace of the entire transition.

Pauses are inserted into a transition effect by placing a pause timing value in a timing field associated with the row of the cell table at which the pause is to be taken. The pause timing value may be any measure, such as the period of time the pause is to run, the time at which the pause is to end, a count of pause increments, etc. In the preferred embodiment, the timing field is simply a single bit flag in flag field 110, and the pause timing value is either zero to indicate no pause or one to indicate a single fixed length pause.

At 220, the ordered cell table is processed to perform the transition effect. In the preferred embodiment, the cell table is processed in the sequential order determined in the foregoing numbering and sorting steps, although it is recognized that yet another level of indirection may be inserted by altering the order of processing at this point, without departing from the spirit and scope of the invention. As each row of the table is processed, clipping means in processor 102 compares the clipping tag for the row to the region(s) of the display known to be affected by the transition effect. If there are none in common, no further processing is performed for the row. Otherwise, the display mapping indicated by the row is performed. In the preferred embodiment, this involves placing the cell located at source X and Y coordinates 112 and 114 into the display buffer location identified by target X and Y coordinates 120 and 122, which in turn causes the corresponding cell on the visual display to change. Next, pause timing means in processor 102 checks the timing field to determine whether a pause is to be taken before processing the next row. In the preferred embodiment this involves testing whether the pause flag in flag field 110 is set. If the timing field indicates no pause, processing continues with the next row; if a pause is indicated, a wait state is entered for the required period of time and then processing continues with the next row.

It is to be noted that step 220 need not be executed immediately following step 218. In fact, all of steps 202–218 can be completed off-line, that is prior to performing the transition effect on an actual image. In this case step 220 is omitted, and the sorted table is stored in computer-accessible memory, optionally along with other tables similarly generated. Each table may be associated by name, location, etc. with the transition effect it represents. At runtime, when it is desired to perform the effect, the table is used to index the source and target cell locations in table-sorted order.

Transition Effect Example

Figures 5A, 5B:
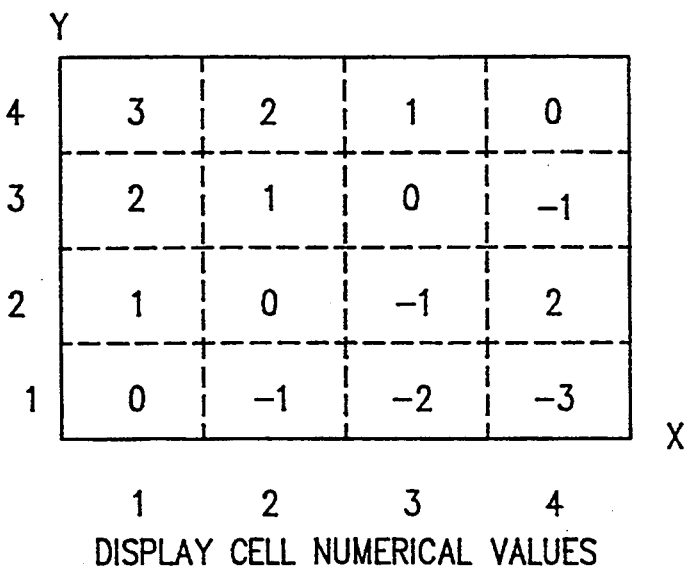

Shown in FIG. 5(a) is an exemplary cell table corresponding to a particular transition effect. It is assumed that the visual display is 640 pels by 480 pels, and is divided into 16 cells, each of which is 160 pels by 120 pels. The transition desired is a diagonal line which moves from the upper left to the lower right of the display. The equation selected to create this effect is: sort value=X−Y. The resulting sort values are depicted in FIG. 5(b). The cell table of FIG. 5(a) has 16 rows, one for each cell. The rows are shown sorted in descending order. Rows which have an equal sorting value are shown randomized. The X, Y, w, and h values in the cell table are expressed in pel coordinates.

Using the foregoing specification, the invention may be implemented by standard programming and/or engineering techniques. The resulting program(s) may be stored on disk, diskettes, memory cards, ROM or any other memory device. For execution, the program(s) may be copied into system memory (RAM) 106 associated with processor 102. One skilled in the art of computer science will readily be able to combine the system and process created as described above with appropriate general purpose or special purpose computer hardware to create a computer system embodying the invention. While the invention has been particularly described and illustrated with reference to a preferred embodiment, it will be understood by those skilled in the art that changes in the description and illustrations may be made with respect to form or detail without departing from the spirit and scope of the invention.

What is claimed is:

1. A computer-based system for generating transition effects of source images into target image locations, comprising:
    means for dividing a display into cells;
    memory means for storing display data;
    means for generating a cell table in said memory means, said cell table including a plurality of rows, each row corresponding to one of said cells, each row including a first location field;
    means for selecting a transition effect function having a solution value which varies with horizontal and vertical cell position;
    means for solving said transition effect function for each row;
    means for ordering said rows and sub-ordering rows of said cell table having identical solution values in accordance with said transition effect function solutions including; and
    means for placing cells of a source image into a target image location sequentially in accordance with said ordered rows of said cell table.

2. The computer-based system as recited in claim 1, wherein said first location field corresponds to a source cell location, and wherein each row of said cell table further includes a cell size identifier and a target location field corresponding to a target cell location.

3. The computer-based system as recited in claim 1, wherein said sub-ordering is determined according to a function whose output varies with cell position.

4. The computer-based system as recited in claim 1, wherein said sub-ordering is determined randomly.

5. The computer-based system as recited in claim 1, wherein said means for ordering arranges said rows in increasing numerical order.

6. The computer-based system as recited in claim 1, wherein said means for ordering arranges said rows in decreasing numerical order.

7. The computer-based system as recited in claim 1, further comprising scaling means for normalizing said values into transition panels in accordance with a sorting vector.

8. The computer-based system as recited in claim 1, wherein each row of said cell table further includes a timing field for designating a transition pause associated with the row, and wherein said transition effects system further comprises:

pause timing means, responsive to said timing field, for generating a corresponding pause in said transition effect.

9. The computer-based system as recited in claim 8, wherein said timing field is a single bit flag indicating a fixed length pause.

10. The computer-based system as recited in claim 1, wherein each row of said cell table further includes a clipping tag for designating a region of said display affected by said row, and wherein said transition effects system further comprises:

clipping means, responsive to said clipping tag, for comparing said clipping tag to a region of interest and bypassing processing of the corresponding row if said clipping tag is outside said region of interest.

11. A method for generating transition effects of source images into target image locations, comprising the steps of:

dividing a display into cells;

creating a cell table having a plurality of rows, each row corresponding to one of said cells, each row including a first location field;

selecting a transition effect function having an output which varies with cell position within said cell table;

solving said transition effect function for each row;

ordering said rows and subordering rows of said cell table having identical solution values in accordance with said transition effect function solutions, including; and placing cells of a source image into a target image location sequentially in accordance with said order growth of said cell table.

12. The method as recited in claim 11, wherein said first location field corresponds to a source cell location, and wherein each row of said cell table further includes a cell size identifier and a target location field corresponding to a target cell location.

13. The method as recited in claim 11, wherein said sub-ordering is determined according to a function whose output varies with cell position.

14. The method as recited in claim 11, wherein said sub-ordering is determined randomly.

15. The method as recited in claim 11, wherein said ordering step arranges said rows in increasing numerical order.

16. The method as recited in claim 11, wherein said ordering step arranges said rows in decreasing numerical order.

17. The method as recited in claim 11, further comprising the step of:

normalizing said values into transition panels in accordance with a sorting vector.

18. The method as recited in claim 11, wherein each row of said cell table further includes a timing field for designating a transition pause associated with the row, and wherein said method further comprises the step of:

responsive to said timing field indicating a pause, generating a corresponding pause in said transition effect.

19. The method as recited in claim 11, wherein said timing field is a single bit flag indicating a fixed length pause.

20. The method as recited in claim 11, wherein each row of said cell table further includes a clipping tag for designating a region of said display affected by said row, and wherein said method further comprises the steps of:

comparing said clipping tag to a region of interest and bypassing processing of the corresponding row if said clipping tag is outside said region of interest.

* * * * *